United States Patent
Chang et al.

(10) Patent No.: US 9,354,458 B2
(45) Date of Patent: May 31, 2016

(54) VOLTAGE COMPENSATION CIRCUIT OF GATE DRIVER AND METHOD THEREOF AND LIQUID CRYSTAL DISPLAY DEVICE

(71) Applicant: Shenzhen China Star Optoelectronics Technology Co., Ltd., Shenzhen, Guangdong (CN)

(72) Inventors: Junkai Chang, Shenzhen (CN); Chih-hao Wu, Shenzhen (CN)

(73) Assignee: Shenzhen China Star ptoelectronics Technology Co., Ltd, Shenzhen, Guangdong (CN)

( * ) Notice: Subject to any disclaimer, the term of this patent is extended or adjusted under 35 U.S.C. 154(b) by 307 days.

(21) Appl. No.: 14/232,277

(22) PCT Filed: Aug. 6, 2013

(86) PCT No.: PCT/CN2013/080929
§ 371 (c)(1),
(2) Date: Jan. 12, 2014

(87) PCT Pub. No.: WO2015/007000
PCT Pub. Date: Jan. 22, 2015

(65) Prior Publication Data
US 2015/0153605 A1    Jun. 4, 2015

(30) Foreign Application Priority Data
Jul. 19, 2013   (CN) .......................... 2013 1 03073103

(51) Int. Cl.
G02F 1/133    (2006.01)
G09G 3/36     (2006.01)

(52) U.S. Cl.
CPC .......... *G02F 1/13306* (2013.01); *G09G 3/3677* (2013.01); *G09G 3/3696* (2013.01); *G09G 2320/0223* (2013.01)

(58) Field of Classification Search
CPC combination set(s) only.
See application file for complete search history.

(56) References Cited

U.S. PATENT DOCUMENTS

2009/0058780 A1*   3/2009   Fukano et al. .................. 345/90

FOREIGN PATENT DOCUMENTS

| CN | 101174391 A | 5/2008 |
| CN | 102262852 A | 11/2011 |
| CN | 102968970 A | 3/2013 |

* cited by examiner

*Primary Examiner* — Robin Mishler
(74) *Attorney, Agent, or Firm* — Andrew C. Cheng

(57) ABSTRACT

A voltage compensation circuit includes a voltage detection unit, a digital comparison correction unit, and a voltage adjustment unit. The voltage detection unit detects input voltage of the gate driver and conducts the input voltage to the digital comparison correction unit. The digital comparison correction unit compares the input voltage with reference voltage supplied by a controller for generating a correction controlling signal and conducting the correction controlling signal to the voltage adjustment unit. The voltage adjustment unit adjusts the input voltage and outputs a target voltage according to the correction controlling signal. The gate driver conducts the target voltage to an LCD panel. In this way, a scanning voltage conducted to a gate driver is adjusted. Therefore, a voltage drop will not exist between output voltages of different gate drivers, not only preventing mura from occurring in the LCD panel but also improving display quality of the LCD panel.

10 Claims, 2 Drawing Sheets

VOLTAGE COMPENSATION CIRCUIT OF GATE DRIVER AND METHOD THEREOF AND LIQUID CRYSTAL DISPLAY DEVICE

BACKGROUND OF THE INVENTION

1. Field of the Invention

The present invention relates to the field of liquid crystal display, and more particularly, to a voltage compensation circuit of a gate driver and a method of voltage compensation and a liquid crystal display device.

2. Description of the Prior Art

As shown in FIG. 1, a timing controller 12 controls source drivers 14 to drive data lines of a liquid crystal display (LCD) panel 13 in a conventional LCD device. Also, the timing controller 12 controls gate drivers 10 and 11 to drive scan lines of the LCD panel 13. A VGH voltage is a gate threshold voltage. The VGH voltage is inputted to the gate drivers 10 and 11 through a trace line. Afterwards, the gate drivers 10 and 11 conduct the VGH voltage to the LCD panel 13.

A resistor Rp1 and a resistor Rp2 are trace resistors between the gate drivers 10 and 11. Due to voltage loss of the line resistors when the VGH voltage is conducted through the trace line, a scan voltage conducted to the gate driver 10 is different from a scan voltage conducted to the gate driver 11. The voltage output by the gate driver 11 is smaller than the voltage output by the gate driver 10. The voltage output by the gate driver 11 becomes VGH-$\Delta$V. When a narrow bezel is used in the LCD panel 13, the width of the trace line will become narrow. Besides, the cross-sectional area of the LCD panel 13 will decrease, and the resistance per unit length will increase. When the size of the LCD panel 13 increases, the trace line will become longer. Moreover, the resistance of the resistor Rp1 and the resistance of the resistor Rp2 will increase. According to the formula $\Delta V=IR$, when R becomes larger, $\Delta V$ becomes larger as well. The voltage drop $\Delta V$ tends to cause mura for the LCD panel 13, which will affect display quality of the LCD panel 13.

SUMMARY OF THE INVENTION

An object of the present invention is to provide a voltage compensation circuit of a gate driver and a method thereof and an LCD device for adjusting a VGH voltage conducted to different gate drivers. In this way, a voltage drop will not exist between output voltages of the different gate drivers, which not only prevents mura from occurring in the LCD panel but also improves display quality.

According to the present invention, a voltage compensation circuit of a gate driver, comprises: a voltage detection unit, for detecting an input voltage of the gate driver; a digital comparison correction unit, for receiving a reference voltage supplied by a controller disposed outside of the gate driver and comparing the input voltage with the reference voltage for generating a correction controlling signal; a voltage adjustment unit, for adjusting the input voltage and outputting a target voltage according to the correction controlling signal, and the gate driver outputting the target voltage to a liquid crystal display (LCD) panel.

In one aspect of the present invention, the digital comparison correction unit is an $I_2C$ module, and the controller communicates with the $I_2C$ module through an $I_2C$ data line.

In another aspect of the present invention, the controller is a timing controller, the correction controlling signal is a digital controlling signal, the $I_2C$ module is compared for obtaining a gain of the input voltage and the reference voltage, and the gain is converted into the digital controlling signal by means of ADC (analog-digital converting).

In still another aspect of the present invention, the voltage adjustment unit is an automatic gain adjustment unit, the automatic gain adjustment unit comprises a first resistor, an operational amplifier, and a second resistor, a first terminal of the first resistor is connected to the $I_2C$ module, a first terminal of the operational amplifier is connected to the input voltage, a second terminal of the operational amplifier is connected to ground through the second resistor, the second terminal of the operational amplifier is also connected to a second terminal of the first resistor, and a third terminal of the operational amplifier is connected to a third terminal of the first resistor.

In still another aspect of the present invention, the operational amplifier is a non-inverting operational amplifier, and the first resistor is a variable resistor which is programmed.

In yet another aspect of the present invention, the automatic gain adjustment unit changes resistance of the first resistor according to the correction controlling signal, the operational amplifier outputs the target voltage according to a formula related to the resistance of the first resistor, and the formula is as follows:

$V2=V1\ (R1+R2)/R2$ in which V1 denotes the input voltage, V2 denotes the target voltage, R1 denotes the resistance of the first resistor, and R2 denotes resistance of the second resistor.

According to the present invention, a method of voltage compensation for use in a gate driver comprises: detecting an input voltage of the gate driver by using a voltage detection unit and conducting the input voltage to a digital comparison correction unit; comparing the input voltage with a reference voltage supplied by a controller disposed outside of the gate driver by using the digital comparison correction unit, to generate a correction controlling signal, and conducting the correction controlling signal to a voltage adjustment unit; adjusting the input voltage by using the voltage adjustment unit and outputting a target voltage according to the correction controlling signal; outputting the target voltage by using the gate driver to an LCD panel.

In one aspect of the present invention, the digital comparison correction unit is an $I_2C$ module, the controller is a timing controller, and the controller communicates with the $I_2C$ module through an $I_2C$ data line, the correction controlling signal is a digital controlling signal, the $I_2C$ module obtains a gain of the input voltage and the reference voltage by using a differential amplifier, and the gain is converted into the digital controlling signal by means of ADC (analog-digital converting).

In another aspect of the present invention, the voltage adjustment unit is an automatic gain adjustment unit, the automatic gain adjustment unit comprises a first resistor, an operational amplifier, and a second resistor, a first terminal of the first resistor is connected to the $I_2C$ module, a first terminal of the operational amplifier is connected to the input voltage, a second terminal of the operational amplifier is connected to ground through the second resistor, the second terminal of the operational amplifier is also connected to a second terminal of the first resistor, and a third terminal of the operational amplifier is connected to a third terminal of the first resistor, the automatic gain adjustment unit changes resistance of the first resistor according to the correction controlling signal, the operational amplifier outputs the target voltage according to a formula related to the resistance of the first resistor, and the formula is as follows:

$V2=V1 (R1+R2)/R2$ in which V1 denotes the input voltage, V2 denotes the target voltage, R1 denotes the resistance of the first resistor, and R2 denotes resistance of the second resistor.

According to the present invention, a liquid crystal display (LCD) device comprises: an LCD panel for displaying images; a gate driver for supplying driving voltage to the LCD panel. The gate driver comprises a voltage compensation circuit. The voltage compensation circuit comprises: a voltage detection unit, for detecting an input voltage of the gate driver; a digital comparison correction unit, for receiving a reference voltage supplied by a controller disposed outside of the gate driver and comparing the input voltage with the reference voltage for generating a correction controlling signal; a voltage adjustment unit, for adjusting the input voltage and outputting a target voltage according to the correction controlling signal, and the gate driver outputting the target voltage to the LCD panel.

In one aspect of the present invention, the digital comparison correction unit is an I$_2$C module, and the controller communicates with the I$_2$C module through an I$_2$C data line.

In another aspect of the present invention, the controller is a timing controller, the correction controlling signal is a digital controlling signal, the I$_2$C module is compared for to obtaining a gain of the input voltage and the reference voltage, and the gain is converted into the digital controlling signal by means of ADC (analog-digital converting).

In still another aspect of the present invention, the voltage adjustment unit is an automatic gain adjustment unit, the automatic gain adjustment unit comprises a first resistor, an operational amplifier, and a second resistor, a first terminal of the first resistor is connected to the I$_2$C module, a first terminal of the operational amplifier is connected to the input voltage, a second terminal of the operational amplifier is connected to ground through the second resistor, the second terminal of the operational amplifier is also connected to a second terminal of the first resistor, and a third terminal of the operational amplifier is connected to a third terminal of the first resistor.

In still another aspect of the present invention, the operational amplifier is a non-inverting operational amplifier, and the first resistor is a variable resistor which is programmed.

In yet another aspect of the present invention, the automatic gain adjustment unit changes resistance of the first resistor according to the correction controlling signal, the operational amplifier outputs the target voltage according to a formula related to the resistance of the first resistor, and the formula is as follows:

$V2=V1 (R1+R2)/R2$ in which V1 denotes the input voltage, V2 denotes the target voltage, R1 denotes the resistance of the first resistor, and R2 denotes resistance of the second resistor.

Compared with the prior art, the present invention has benefits that a voltage drop does not exist between the output voltages of the different gate drivers, which not only prevents mura from occurring in the LCD panel but also improves display quality of the LCD panel. This is because in the present invention, the digital comparison correction unit compares the input voltage of the gate driver detected by the voltage detection unit with the reference voltage supplied by the controller for generating the correction controlling signal. The voltage adjustment unit adjusts the input voltage and outputs a target voltage according to the correction controlling signal. So the VGH voltage conducted to the different gate drivers can be adjusted and then the different gate drivers can output identical target voltages.

DETAILED DESCRIPTION OF THE PREFERRED EMBODIMENTS

Figure 1:
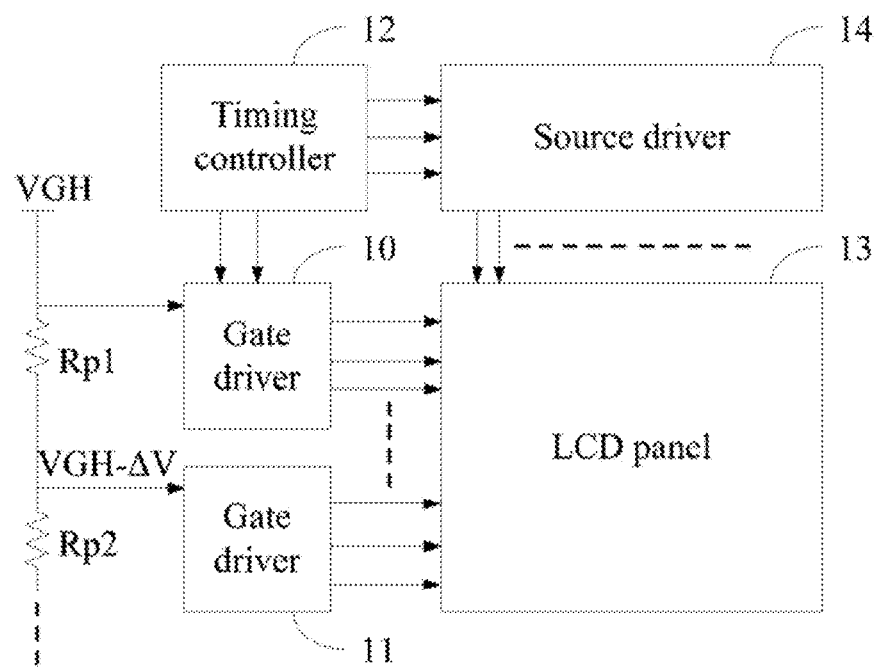
FIG. 1 is a schematic diagram of a conventional LCD device.
Figure 2:
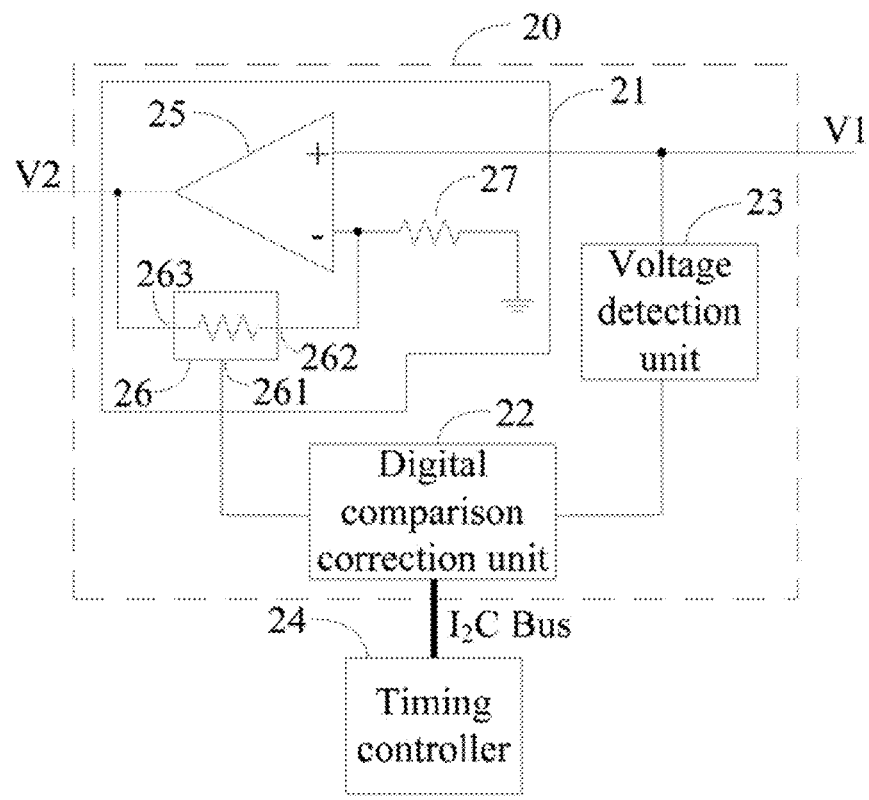
FIG. 2 is a schematic diagram illustrating the structure of a voltage compensation circuit of a gate driver according to one embodiment of the present invention.

FIG. 2 is a schematic diagram illustrating the structure of a voltage compensation circuit 20 of a gate driver according to one embodiment of the present invention. The voltage compensation circuit 20 is disposed in front of an output of the gate driver. The voltage compensation circuit 20 is used for adjusting voltage supplied by the gate driver to an LCD panel. Preferably, a voltage compensation circuit 20 is disposed on every gate driver. The voltage compensation circuit 20 comprises a voltage adjustment unit 21, a digital comparison correction unit 22, and a voltage detection unit 23, as shown in FIG. 2.

The voltage detection unit 23 detects an input voltage V1 of the gate driver and conducts the input voltage V1 to the digital comparison correction unit 22. The digital comparison correction unit 22 also receives a reference voltage supplied by a timing controller 24 disposed outside of the gate driver. In addition, the digital comparison correction unit 22 compares the input voltage V1 with the reference voltage for generating a correction controlling signal which is conducted to the voltage adjustment unit 21 afterwards. The voltage adjustment unit 21 adjusts the input voltage V1 and outputs a target voltage V2 according to the correction controlling signal. The gate driver outputs the target voltage V2 to the LCD panel.

The digital comparison correction unit 22 is an I$_2$C module in the present embodiment. The timing controller 24 communicates with the I$_2$C module through an I$_2$C data line. The correction controlling signal is a digital controlling signal. The I$_2$C module is compared, for example, by a differential amplifier (not shown), for obtaining a gain of the input voltage and the reference voltage. The gain is converted into the digital controlling signal by means of ADC (analog-digital converting).

The voltage adjustment unit 21 is an automatic gain adjustment unit in the present embodiment. The voltage adjustment unit 21 comprises a first resistor 26, an operational amplifier 25, and a second resistor 27. A first terminal 261 of the first resistor 26 is connected to the I$_2$C module. A first terminal (non-inverting input node) of the operational amplifier 25 is connected to the input voltage V1. A second terminal (inverting input node) of the operational amplifier 25 is connected to ground through the second resistor 27. The inverting input node of the operational amplifier 25 is also connected to a second terminal 262 of the first resistor 26. A third terminal (output node) of the operational amplifier 25 is connected to a third terminal 263 of the first resistor 26. The operational amplifier 25 is a non-inverting operational amplifier. The first resistor 26 is a variable resistor which can be programmed. The automatic gain adjustment unit changes resistance of the first resistor 26 according to the correction controlling signal. The operational amplifier 25 outputs the target voltage V2 according to a formula related to the resistance of the first resistor 26. The formula is as follows:

V2=V1 (R1+R2)/R2, where V1 denotes the input voltage, R1 denotes the resistance of the first resistor 26, and R2 denotes the resistance of the second resistor 27.

The input voltage conducted to different gate drivers is adjusted for correspondingly compensating for loss generated when the input voltage is conducted to the different gate drivers in this embodiment. Then, the different gate drivers output identical target voltages. In this way, a voltage drop does not exist between output voltages of the different gate drivers, which not only prevents mura from occurring in the LCD panel but also improves display quality of the LCD panel.

Figure 3:
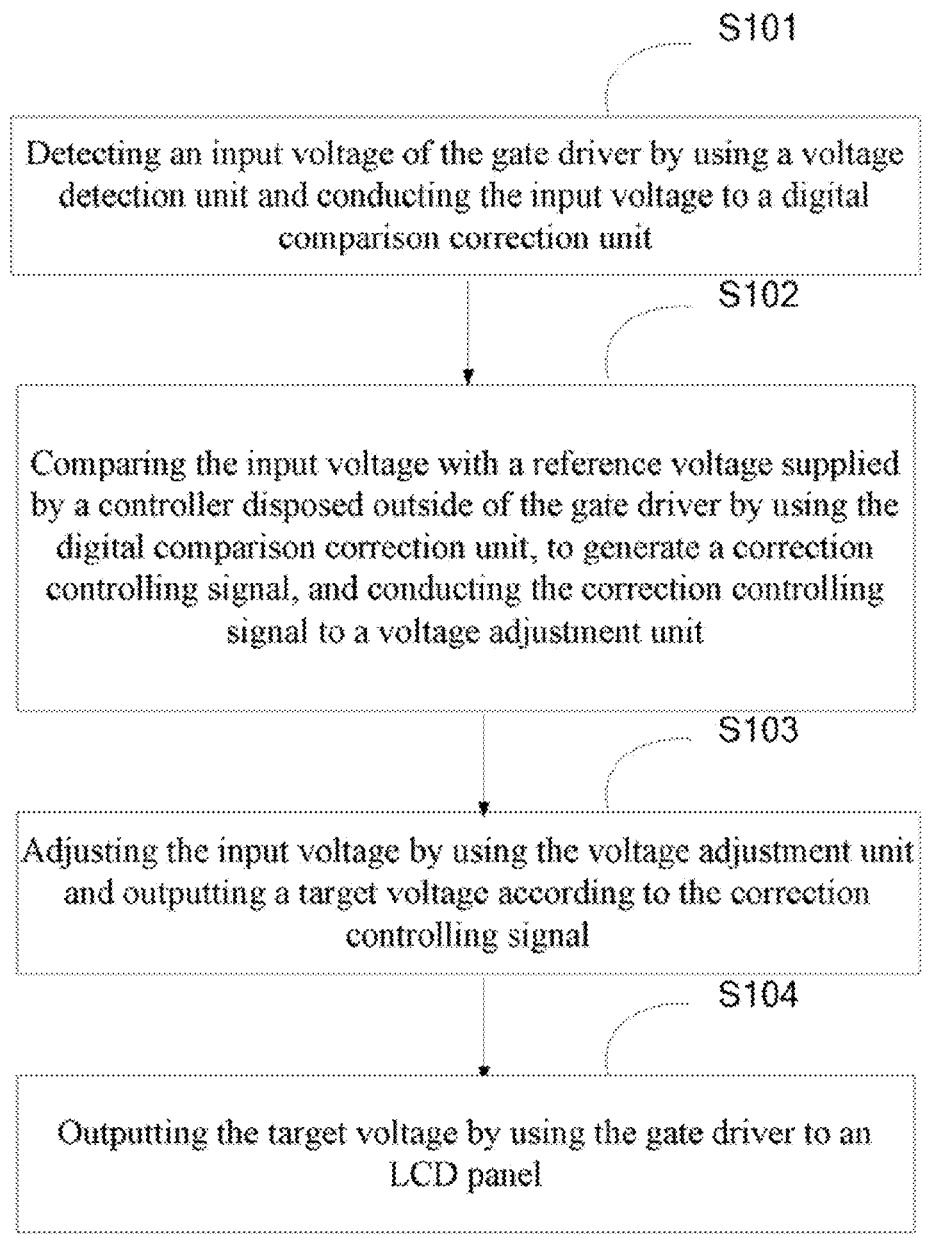
FIG. 3 is a flowchart of a voltage compensation method by using the gate driver according to one embodiment of the present invention.

FIG. 3 is a flowchart of a voltage compensation method by using the gate driver according to the embodiment of the present invention. The voltage compensation method of the gate driver comprises the following steps of:

Step S101: A voltage detection unit detects an input voltage of a gate driver and conducts the input voltage to a digital comparison correction unit. The digital comparison correction unit is an $I_2C$ module.

Step S102: The digital comparison correction unit compares the input voltage with a reference voltage supplied by a controller disposed outside of the gate driver for generating a correction controlling signal and conducts the correction controlling signal to a voltage adjustment unit. The voltage adjustment unit is an automatic gain adjustment unit. The correction controlling signal is a digital controlling signal. An outside controller is a timing controller and communicates with an $I_2C$ module through an $I_2C$ data line. In Step S102, the $I_2C$ module is compared by a differential amplifier for obtaining a gain of the input voltage and the reference voltage. The gain is converted into the digital controlling signal by means of ADC (analog-digital converting).

Step S103: The voltage adjustment unit adjusts the input voltage and then outputs a target voltage according to the correction controlling signal. The automatic gain adjustment unit also comprises a first resistor, an operational amplifier, and a second resistor. The automatic gain adjustment unit changes resistance of the first resistor according to the correction controlling signal in Step S103. The operational amplifier outputs the target voltage according to a formula related to the resistance of the first resistor. The formula is as follows:

V2=V1 (R1+R2)/R2, wherein V1 denotes the input voltage, V2 denotes the target voltage, R1 denotes the resistance of the first resistor, and R2 denotes the resistance of the second resistor.

Step S104: The gate driver outputs the target voltage to the LCD panel.

In the present embodiment, the digital comparison correction unit compares the input voltage of the gate driver detected by the voltage detection unit with the reference voltage supplied by the outside controller for generating the correction controlling signal. The voltage adjustment unit adjusts the input voltage and outputs the target voltage to the LCD panel according to the correction controlling signal. Thus, loss generated when the input voltage is conducted to the different gate drivers is compensated for so that the different gate drivers output identical target voltages. In this way, a voltage drop does not exist between the output voltages of the different gate drivers, which not only prevents mura from occurring in the LCD panel but also improves display quality of the LCD panel.

Figure 4:
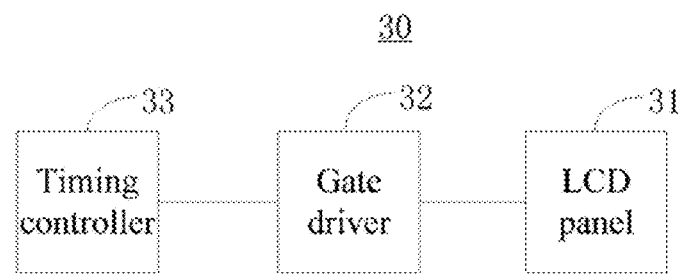
FIG. 4 is a schematic diagram of an LCD device according to one embodiment of the present invention.

An LCD device 30 is also provided in the present invention. FIG. 4 is a schematic diagram illustrating the structure of the LCD device 30 according to one embodiment of the present invention. The LCD device 30 comprises an LCD panel 31, a gate driver 32, and a timing controller 33. The LCD panel 31 is used for displaying images. The gate driver 32 is used for supplying the LCD panel 31 with a driving voltage. The timing controller 33 is used for controlling and driving the gate driver 32. The gate driver 32 comprises a voltage compensation circuit of the gate driver as shown in FIG. 2. The structure and working principle of the voltage compensation circuit will not be explained in detail hereafter.

In conclusion, the digital comparison correction unit compares the input voltage of the gate driver detected by the voltage detection unit with the reference voltage supplied by the outside controller for generating the correction controlling signal. The voltage adjustment unit adjusts the input voltage and outputs the target voltage according to the correction controlling signal. The target voltage is outputted by the gate driver to the LCD panel. Thus, the input voltage conducted to the different gate drivers is adjusted for correspondingly compensating for loss generated when the input voltage is conducted to the different gate drivers. The different gate drivers output identical target voltages. In this way, a voltage drop does not exist between the output voltages of the different gate drivers, which not only prevents mura from occurring in the LCD panel but also increases display quality of the LCD panel.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A voltage compensation circuit of a gate driver, comprising:
    a voltage detection unit, for detecting an input voltage of the gate driver;
    a digital comparison correction unit, for receiving a reference voltage supplied by a controller disposed outside of the gate driver and comparing the input voltage with the reference voltage for generating a correction controlling signal;
    a voltage adjustment unit, for adjusting the input voltage and outputting a target voltage according to the correction controlling signal, and the gate driver outputting the target voltage to a liquid crystal display (LCD) panel,
    wherein the voltage adjustment unit is an automatic gain adjustment unit, the automatic gain adjustment unit comprises a first resistor, an operational amplifier, and a second resistor, a first terminal of the first resistor is connected to the $I_2C$ module, a first terminal of the operational amplifier is connected to the input voltage, a second terminal of the operational amplifier is connected to ground through the second resistor, the second terminal of the operational amplifier is also connected to a second terminal of the first resistor, and a third terminal of the operational amplifier is connected to a third terminal of the first resistor.

2. The voltage compensation circuit as claimed in claim 1, wherein the digital comparison correction unit is an $I_2C$ module, and the controller communicates with the $I_2C$ module through an $I_2C$ data line.

3. The voltage compensation circuit as claimed in claim 2, wherein the controller is a timing controller, the correction controlling signal is a digital controlling signal, the I$_2$C module is compared for obtaining a gain of the input voltage and the reference voltage, and the gain is converted into the digital controlling signal by means of ADC (analog-digital converting).

4. The voltage compensation circuit as claimed in claim 1, wherein the operational amplifier is a non-inverting operational amplifier, and the first resistor is a variable resistor which is programmed.

5. The voltage compensation circuit as claimed in claim 4, wherein the automatic gain adjustment unit changes resistance of the first resistor according to the correction controlling signal, the operational amplifier outputs the target voltage according to a formula related to the resistance of the first resistor, and the formula is as follows:
V2=V1 (R1+R2) /R2 in which V1 denotes the input voltage, V2 denotes the target voltage, R1 denotes the resistance of the first resistor, and R2 denotes resistance of the second resistor.

6. A method of voltage compensation for use in a gate driver, comprising:
detecting an input voltage of the gate driver by using a voltage detection unit and conducting the input voltage to a digital comparison correction unit;
comparing the input voltage with a reference voltage supplied by a controller disposed outside of the gate driver by using the digital comparison correction unit, to generate a correction controlling signal, and conducting the correction controlling signal to a voltage adjustment unit;
adjusting the input voltage by using the voltage adjustment unit and outputting a target voltage according to the correction controlling signal;
outputting the target voltage by using the gate driver to an LCD panel;
wherein the voltage adjustment unit is an automatic gain adjustment unit, the automatic gain adjustment unit comprises a first resistor, an operational amplifier, and a second resistor, a first terminal of the first resistor is connected to the I$_2$C module, a first terminal of the operational amplifier is connected to the input voltage, a second terminal of the operational amplifier is connected to ground through the second resistor, the second terminal of the operational amplifier is also connected to a second terminal of the first resistor, and a third terminal of the operational amplifier is connected to a third terminal of the first resistor, the automatic gain adjustment unit changes resistance of the first resistor according to the correction controlling signal, the operational amplifier outputs the target voltage according to a formula related to the resistance of the first resistor, and the formula is as follows:
V2=V1 (R1+R2) /R2 in which V1 denotes the input voltage, V2 denotes the target voltage, R1 denotes the resistance of the first resistor, and R2 denotes resistance of the second resistor.

7. The method as claimed in claim 6, wherein the digital comparison correction unit is an I$_2$C module, the controller is a timing controller, and the controller communicates with the I$_2$C module through an I$_2$C data line, the correction controlling signal is a digital controlling signal, the I$_2$C module obtains a gain of the input voltage and the reference voltage by using a differential amplifier, and the gain is converted into the digital controlling signal by means of ADC (analog-digital converting).

8. A liquid crystal display (LCD) device comprising:
an LCD panel for displaying images;
a gate driver for supplying driving voltage to the LCD panel, comprising a voltage compensation circuit, the voltage compensation circuit comprising:
a voltage detection unit, for detecting an input voltage of the gate driver;
a digital comparison correction unit, for receiving a reference voltage supplied by a controller disposed outside of the gate driver and comparing the input voltage with the reference voltage for generating a correction controlling signal;
a voltage adjustment unit, for adjusting the input voltage and outputting a target voltage according to the correction controlling signal, and the gate driver outputting the target voltage to the LCD panel,
wherein the digital comparison correction unit is an I$_2$C module, and the controller communicates with the I$_2$C module through an I$_2$C data line,
wherein the controller is a timing controller, the correction controlling signal is a digital controlling signal, the I$_2$C module is compared for obtaining a gain of the input voltage and the reference voltage, and the gain is converted into the digital controlling signal by means of ADC (analog-digital converting),
wherein the voltage adjustment unit is an automatic gain adjustment unit, the automatic gain adjustment unit comprises a first resistor, an operational amplifier, and a second resistor, a first terminal of the first resistor is connected to the I$_2$C module, a first terminal of the operational amplifier is connected to the input voltage, a second terminal of the operational amplifier is connected to ground through the second resistor, the second terminal of the operational amplifier is also connected to a second terminal of the first resistor, and a third terminal of the operational amplifier is connected to a third terminal of the first resistor.

9. The LCD device as claimed in claim 8, wherein the operational amplifier is a non-inverting operational amplifier, and the first resistor is a variable resistor which is programmed.

10. The LCD device as claimed in claim 9, wherein the automatic gain adjustment unit changes resistance of the first resistor according to the correction controlling signal, the operational amplifier outputs the target voltage according to a formula related to the resistance of the first resistor, and the formula is as follows:
V2=V1 (R1+R2) /R2 in which V1 denotes the input voltage, V2 denotes the target voltage, R1 denotes the resistance of the first resistor, and R2 denotes resistance of the second resistor.

* * * * *